United States Patent [19]

Fassauer

[11] Patent Number: 4,651,679
[45] Date of Patent: Mar. 24, 1987

[54] PELLETIZED MATERIAL FEEDER AND WATER COMBINATION

[76] Inventor: Arthur L. Fassauer, 420 Foster La., Canyon, Tex. 79015

[21] Appl. No.: 723,056

[22] Filed: Apr. 15, 1985

Related U.S. Application Data

[63] Continuation-in-part of Ser. No. 459,767, Jan. 21, 1983, Pat. No. 4,513,688.

[51] Int. Cl.$^4$ ............................ A01K 5/00; A01K 7/00
[52] U.S. Cl. .................................................... 119/51.5
[58] Field of Search ...................... 119/51.11, 51.5, 72, 119/73

[56] References Cited
U.S. PATENT DOCUMENTS

| | | | |
|---|---|---|---|
| 1,224,043 | 4/1917 | Thompson | 119/72 |
| 2,629,040 | 2/1953 | Smith | 119/73 |
| 3,920,224 | 11/1975 | Fassauer | 119/51.11 X |
| 4,192,256 | 3/1980 | Clugston | 119/51.5 |
| 4,485,765 | 12/1984 | Schwartz et al. | 119/51.13 |

*Primary Examiner*—Hugh R. Chamblee
*Attorney, Agent, or Firm*—Jerry W. Mills; Gregory M. Howison

[57] ABSTRACT

A combined animal feeder and waterer including a hopper (20) that stores a quantity of pelletized material and is partially closed at the bottom by a restricting plate (40). The restricting plate has an orifice (38) extending therethrough and offset from the center of the hopper (20). The orifice (38) extends downwardly and rearwardly into an agitation chamber (32) wherein a rotor (34) is disposed for agitating the pelletized material and disposing it outward through an orifice into a feeding bowl (16). A water reservoir (66) is included in the base and integral therewith and communicates with a drinking well (17) through an orifice (70). The orifice (70) is disposed in the lower portion of the interface between the reservoir (66) and the drinking well (17). A breathing hole (72) allows the water in the reservoir (66) to seek the same level as the water in the drinking well (17) by a gravity feed distribution system. The size of the drinking well (17) is small relative to the size of the reservoir (66). This significantly reduces evaporation and temperature variations in the water and the reservoir (66) while minimizing the entry of contaminants into the reservoir (66).

7 Claims, 8 Drawing Figures

PELLETIZED MATERIAL FEEDER AND WATER COMBINATION

CROSS REFERENCE TO RELATED APPLICATIONS

This application is a continuation-in-part of Ser. No. 459,767 filed Jan. 21, 1983, now U.S. Pat. No. 4,513,688.

TECHNICAL FIELD

The invention pertains in general to animal feeders and, more particularly, to a feeder for dispensing pelletized material and water.

BACKGROUND OF THE INVENTION

A wide variety of devices have been utilized for providing nourishment for dogs and small animals in the form of both pelletized dog food dispensers and water dispensers. One example of a pelletized feeder is illustrated in U.S. Pat. No. 3,920,224, issued to the present Applicant. In addition, watering devices are well known which store the water in a sealed container with a small tube extending from the bottom. Water is prevented from exiting this tube due to the negative pressure formed at the top of the water in the vessel until an animal agitates the end of the tube. These type of waterers are utilized for chicken feeders, guinea pig feeders, etc.

In providing water source for a pet for extended periods of time, the above described waterers are utilized in conjunction with a large bowl or receptacle to hold the water. When an open receptacle is utilized, the water has a tendency to evaporate and also can become soiled due to the large exposed surface area of the receptacle. This open area with its resulting exposure to the elements, dust, etc., becomes soiled due to the fact that the animal drops particles of dirt into the large drinking vessel that is commonly used every time it drinks water, especially after an extended period of time. The water may become very unsanitary.

In combination waterers and feeders, the waterers normally are placed in a parallel configuration, side by side or back to back, next to the feeder hopper such that they operate in the above described vacuum method. This normally requires the water to have a relatively high center of gravity which, when combined with the hopper, results in a rather unstable device. This high center of gravity can be compensated for by weighting of the base but this increases the expense.

There exists a need for a watering device which is useful for extended periods of time but does not have the disadvantages of the above waterers regarding evaporation, high center of gravity or the ability to become soiled.

SUMMARY OF THE INVENTION

The present invention disclosed and claimed herein comprises an apparatus for providing water to a pet for extended periods of time. The apparatus includes a reservoir for holding a vacuum of water and having a predetermined height. The reservoir is in communication with the surrounding environment such that the pressure above the water contained in the reservoir is equal to that of the surrounding environment. A drinking well is provided adjacent the reservoir for providing a limited amount of water to the pet for drinking, the water supplied thereto by the reservoir. The surface area of the accessible water in the drinking well is limited to the maximum necessary for the pet to drink. The depth of the water in the drinking well is equal to the depth of the water in the reservoir. Soiling of the water in the drinking well is prevented from soiling water in the reservoir by allowing flow therebetween to occur only at the bottom of the reservoir and drinking well. This allows only a positive flow of water from one to the other.

In another embodiment of the present invention, the watering apparatus is combined with a feeder which has a raised hopper disposed above the watering apparatus with an agitation chamber disposed therebetween. Food is disposed in the hopper and passed through the agitation chamber to a feeding bowl which is mounted adjacent to the drinking well. The weight of the water compensates for the high center of gravity of the food in the hopper such that toppling of the apparatus is prevented. In addition, the water reservoir is disposed on the center line of the hopper to further prevent toppling.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
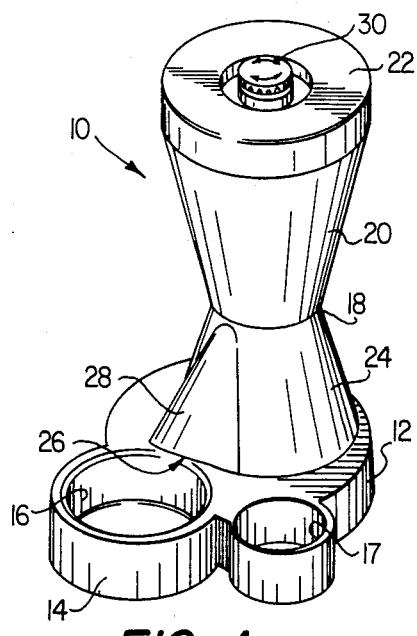
FIG. 1 illustrates a perspective view of the pelletized feeder of the present invention.

Referring now to FIG. 1, there is illustrated a perspective view of a pelletized material feeder 10 of the present invention. The feeder 10 includes a cylindrical base 12 having a cylindrical projection 14 extending therefrom. The cylindrical projection 14 houses an eating bowl 16 and a drinking well 17. The eating bowl 16 may be formed integrally with the base 12 as shown, or may be removable or include a removable liner for apparent sanitary reasons. The drinking well 17, as will be described hereinbelow, can be formed integral with the base or as a detachable portion thereof. Mounted on the top portion of the base 12 is an upstanding hopper and feeder module 18 including a conical hopper section 20 having upwardly and outwardly extending walls and which is closed at the top by a removable cylindrical cover 22. Between the hopper section 20 and the base 12, there is feed distribution section 24 having downwardly and outwardly extending walls. A feed distribution opening 26 is formed in the feed distribution section 24 and is partially enclosed by a cover member 28. A manual control knob 30 is mounted on the cover 22 to allow an operator to manually distribute food through the opening 26, as will be described hereinbelow.

Figure 2:
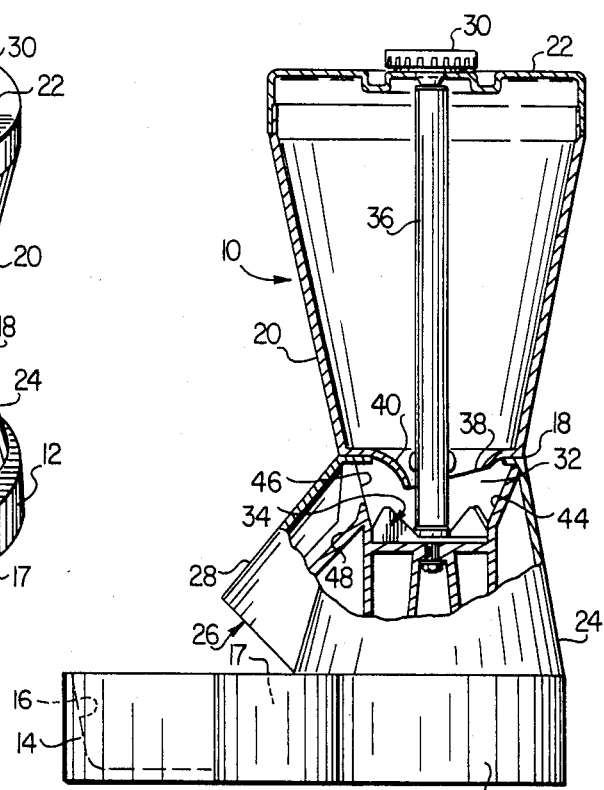
FIG. 2 illustrates a sectional view of the hopper and agitation chamber of the feeder.

Referring now to FIG. 2, there is illustrated a side cross-sectional view of the feeder 10 of FIG. 1. The feed distribution section 24 has an agitation chamber 32 for receiving food from the hopper section 20. A rotor 34 is rotationally mounted in the bottom of the agitation chamber 32. A shaft 36 is connected between the control knob 30 and the rotor 34 and co-rotatable therewith. The shaft 36 allows the rotor 34 to be manually rotated by the control knob 30. Pelletized matter disposed in the hopper section 20 is allowed to fall into the agitation chamber 32 through an orifice 38 disposed in a restricting plate 40. The orifice 38 disposed through the restriction plate 40 has its radial center offset from the center of the hopper section 20 through which the shaft 36 passes and the orifice 38 is tilted rearwardly from the opening 26 in the agitation chamber 32 such that pelletized material flowing from the hopper section 20 to the agitation/dispensing chamber 32 is oriented toward the rear of the agitation chamber 32 with the respect to the opening 26 so as to assure a positive flow from the hopper section 20 into the agitation chamber 32, and also prevents free flow of material from chamber 32 into the bowl 16 through an outlet port 46.

Figure 3:
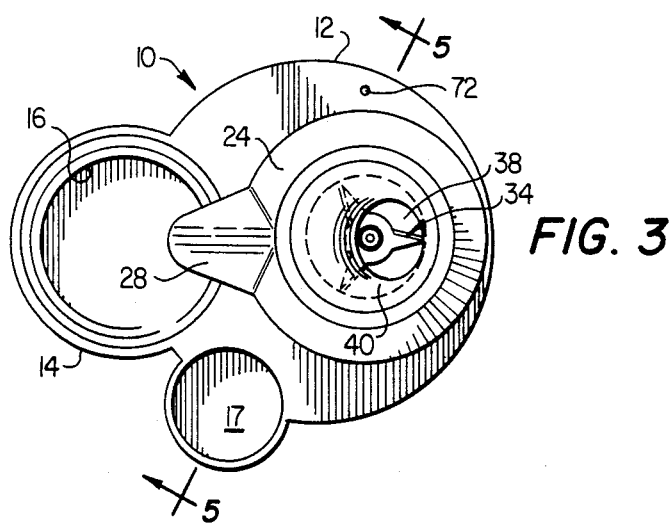
FIG. 3 illustrates a top view of the feeder of the present invention with the top removed.
Figure 4:
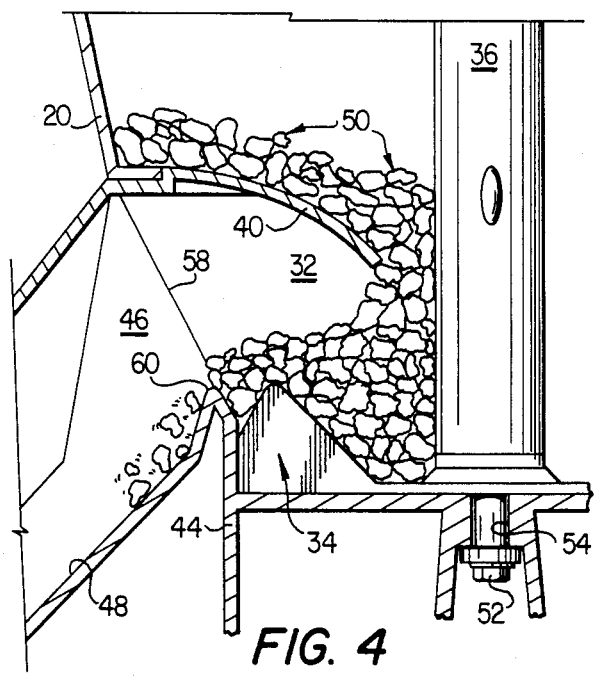
FIG. 4 illustrates an enlarged sectional view of the agitation chamber and agitator assembly with pelletized material therein.

Referring now to FIG. 3, there is illustrated a top view of the feeder 10 with the cover 22, the control knob 30, the shaft 36 and the hopper section 20 removed. FIG. 4 more clearly illustrates the position of the orifice 38 in the restricting plate 40. In addition, it can be seen that the rotor 34 is positioned such that each of the paddles on the rotor 34 upon rotation thereof are essentially proximate the outer peripheral walls of the agitation chamber 32. This maximizes the efficiency of agitation per each revolution of the rotor 34. It should be understood that manual operation of the rotor 34 normally requires only a partial rotation of the rotor 34. As can be seen in FIG. 3, one of the paddles on the rotor 34 is normally present directly beneath the orifice 38 such that pelletized matter resting upon the paddle is agitated by rotation thereof.

Referring now to FIG. 4, there is illustrated an expanded sectional view of the agitation chamber 32 with pelletized matter 50 disposed therein. The rotor 34 is held adjacent the bottom section 44 of the agitation chamber 32. A plastic bushing is disposed between the head of the bolt 52 and the sides of the hole 54 to provide a dry bearing.

When the shaft 36 is not being rotated, the pelletized matter 50 is prevented from exiting through the outlet port 46 and down the ramp 48 into the eating bowl 16 by the shape of the restricting plate 40. The restricting plate 40 has a reduced orifice 38 disposed therethrough that causes pelletized matter 50 to be "clumped" together. That is, the downward force of the pelletized matter 50 in the hopper section 20 does not exert sufficient lateral force to cause movement of the pelletized matter 50 through the outlet 46. This fact depends in part on the high degree of friction existing between individual particles of the pelletized matter 50 which prevents free flow thereof. The shape of the agitation chamber 32 and the restricting plate 40, in addition to the shape of the pelletized matter, are also responsible for this "clumping". Since the orifice 38 is oriented toward the rear of the agitation chamber 32, the pelletized matter 50 is further prevented from inadvertently exiting the agitation chamber 32 through the outlet port 46.

When the rotor 34 is rotated, one of the paddles thereof is urged through the pelletized matter 50. The paddle is shaped such that a large cross-sectional area is urged through the pelletized matter 50. This large surface area directs a force through the pelletized matter 50 that is oriented along the direction of rotation. Since the bottom section 44 of the agitation chamber 32 is essentially filled with pelletized matter 50, the force imparted upon the pelletized matter adjacent the surface of the paddle is met with opposing force by pelletized matter 50 that is disposed nearby. This opposing force results in an upward movement of the pelletized matter 50 to prevent crushing thereof. This upward movement allows the pelletized matter 50 that is agitated by the paddle to move upward and over the top of the paddle in an undulating motion. The paddle is shaped such that the uppermost portion thereof is adjacent the lowermost edge of the outlet port 46. This results in displacement of pelletized matter 50 above the lowermost edge of the outlet port 46 resulting in expulsion through the outlet port 46 and down the ramp 48 to the eating bowl 16. It is important that the passage of the paddle through the pelletized matter 50 results in movement of the pelletized matter upward and outward along the walls of the upper section 45.

When the paddle is rotated past the outlet 46, particulate matter is urged over the lowermost edge thereof and down the ramp 48. However, the paddle at outlet port 46 has a lateral edge 58 in addition to a lowermost edge 60. When the paddle 42 is rotated past the lowermost edge 60 and passes the intersection of the lowermost edge 60 and the lateral edge 58, the shape of a paddle becomes important in that pelletized matter 50 can be wedged between the paddle and the lateral edge 58 since, as described above, the pelletized matter is uneven in shape due to the normally roughened surface thereof.

The paddle is shaped such that the uppermost portion thereof forms a "V" shape with the portion of the wall of the upper section 45 disposed immediately beneath the lowermost edge 60 of the outlet port 46. This shape provides an angle of "repose" that allows pelletized matter wedged between the paddle and the lateral edge 58 an additional degree of freedom. That is, pelletized matter can move upward and outward along the lateral edge 58 thereby preventing entrapment of pelletized matter therebetween. Since entrapment of pelletized matter can result in breakage of the rotor 34 or an increased resistance experienced by the operator of the feeder, the "V" shape substantially alleviates entrapment. This angle of repose is an important aspect of the present invention in that it provides an anti-jam capability for the animal feeder. The manual operation of the rotor 34 in the feeder with the higher cross-sectional area on the paddle requires a higher given force per degree of rotation of the shaft 36. This increased surface area of the paddle also results in a higher opposing force as the paddle rotates through the pelletized matter 50. The addition of fluid like flow of pelletized matter 50 between the paddle and the lateral wall 58 can substantially impede movement of the rotor 34 such that there is either breakage of the paddle or a small amount of breakage of the pelletized matter 50. The breakage of the pelletized matter 50 is undesirable in that this pelletized matter normally crumbles and falls to the bottom of the agitation chamber 32 which is not capable of expulsion through the outlet port 46. Therefore this crumbled pelletized matter 50 has a tendency to build up until the feeder is cleaned. The paddle configuration significantly reduces this breakage or crumbling.

Figure 5:
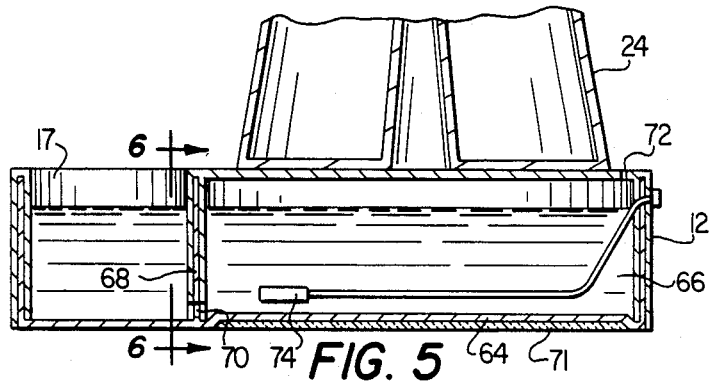
FIG. 5 illustrates a cross-sectional view of the water reservoir and drinking well.

Referring now to FIG. 5, there is illustrated a cross-sectional diagram of the base 12 taken along line 6—6 in FIG. 1 illustrating the drinking well 17 and the base 12. The drinking well 17 is an integral part of a watering portion 64. The watering portion 64 is comprised of two portions, the drinking well 17 and a reservoir 66. The reservoir 66 and the drinking well 17 are separated by a wall 68 and share a common base.

The watering portion 64 is designed similar in shape to the base 12 with an outer diameter on the reservoir 66 that is less than the inner diameter of the base 12 such that the reservoir portion 66 fits internal to the base 12. A slot (not shown) is formed in the periphery of the base 12 such that the drinking well 17 which protrudes outward of the base 12 can be accommodated. In this manner, the drinking apparatus 64 can be removed from the base 12, the top of the reservoir 66 being open.

The wall 68 separating the reservoir 66 from the drinking well 17 has an orifice 70 disposed therethrough adjacent the base of the drinking well 17 to allow communication between the drinking well 17 and the reservoir 66. When wter is contained in the reservoir 66, the orifice 70 allows water to flow therethrough and seek the same level in the drinking well 17 as that in the reservoir 66. As water is removed from the drinking well 17, it is replaced through the orifice 70 from the reservoir 66. Reservoir 66 holds approximately two to three gallons of water whereas the drinking well 17 holds a maximum of approximately one cup of water. To facilitate movement of water from reservoir 66 to drinking well 17, a breathing hole 72 is formed in the top of base 12 to allow equalization of pressure in the top of the water in the reservoir 66. However, this orifice 72 may be dispensed with since air can enter from the sides of the reservoir 66.

The size of the drinking well 17 relative to the size of the reservoir 66 is an important aspect of the present invention. In the preferred embodiment, the diameter of the drinking well 17 at the uppermost portion is approximately 4 inches whereas the diameter of the reservoir 66 is approximately 12 inches. The wall 68 is a vertical wall. Therefore, only a small surface area of the total volume of water contained in the watering portion 64 is exposed to the environment and accessable by the pet. Since a pet drinks by lapping with its tongue, it is only important to provide a drinking well or area that is equivalent or slightly larger than the tongue of the animal. In this manner, the animal is provided with the maximum surface area required for it to drink and the reservoir 66 constantly replenishes the water in the drinking well 17 at the same level as that in the reservoir 66. The diameter of the drinking well 17 therefore closely approximates the width of the pet's tongue.

The use of a relatively smaller drinking well than the reservoir also reduces the amount of soiling of the water. For example, after a pet eats the pelletized matter out of the bowl 16, it will drink water out of the drinking well 17. This results in particulate matter accumulating in the bowl. By separating the drinking well from the reservoir, this particulate matter will usually be lapped up with the water by the pet. If a small area were not provided and a large diameter water bowl were utilized, the residual particulate matter resulting from prior feeding would float away from the area in which the pet was lapping water and remain at the bottom of the water supply. For extended periods, this particulate matter can cause the water to become quite unsanitary.

To maintain an even temperature in the water contained in the reservoir 66, the bottom of the reservoir 66 may be covered with an insulating layer 71. The insulating layer 71 can be fabricated from some form of styrofoam or thin material having an open celled structure. Additionally, the material from which the drinking apparatus 64 is formed can be of insulating material.

To prevent freezing in winter, a small immersion heater 74 operated from an AC source (not shown) is disposed in the bottom of the base 12. The heater 74 need only supply between 5 to 10 watts of continuous power to provide sufficient heat to prevent the water in the reservoir 66 from freezing. However, higher power immersion heaters such as type CSL manufactured by Emerson Electric can be utilized with thermostatic controls (not shown) associated therewith. The insulating layer 70 on the lower side of the reservoir 66 prevents heat transfer between such surfaces as a cement walkway and the water contained in the reservoir 66. Additionally, the reservoir 66 can be mounted on stand offs which maintain the lower surface of the reservoir 66 away from any surfaces having temperature extremes.

Figure 6A:
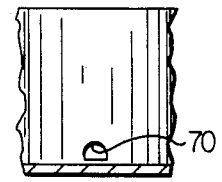
FIGS. 6a and 6b illustrate cross-sectional diagrams of two embodiments of the communication orifice.
Figure 6B:
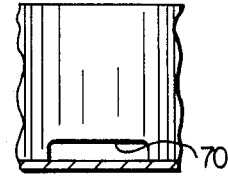

Referring now to FIGS. 6a and 6b, there are illustrated sectional diagrams of two embodiments of the orifice 70 taken along line 6—6 in FIG. 5. FIG. 6a illustrates one embodiment wherein the orifice 70 is a round hole. FIG. 6b illustrates an alternate embodiment wherein the orifice 70 is a slot. With the orifice 70 being a round hole, the size of the hole can be dimensioned to restrict flow from the reservoir 66 to the drinking well 17. By so restricting the flow, the pet will be required to fully lap up the water and clean the bottom of the drinking well 17 before additional water can flow through the orifice 70. This facilitates the hygiene of the drinking well 17. With the use of the slot 70, the flow of water from the reservoir 66 to the drinking well 17 is increased to allow a faster flow of fluids.

To fill reservoir 66, it is only necessary to pour water into the drinking well 17 without requiring the pet owner to fully disassemble a unit and take it to a faucet. Depending upon the size of the orifice 70, another access may be included on the upper surface of the base 12 without the disassembly thereof to allow filling directly in the reservoir 66. This could be in the form of a screw cap (not shown). However, with the use of the slot of the orifice 70, water can be poured in at a relatively fast rate.

Figure 7:
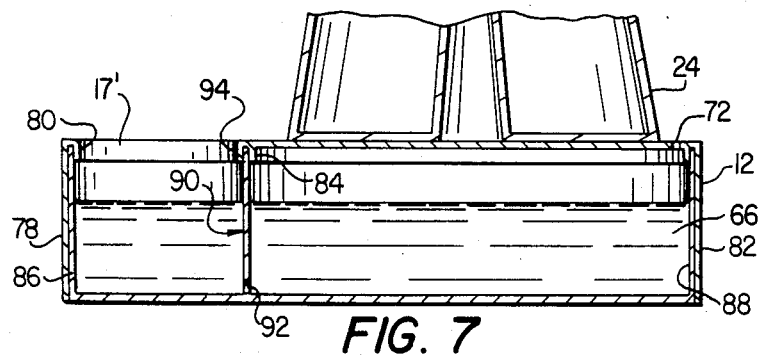
FIG. 7 illustrates a cross-sectional diagram of an alternate embodiment of the reservoir and drinking well.

Referring now to FIG. 7, there is illustrated an alternate embodiment of the structure of the watering portion 64 of FIG. 5. In FIG. 7, the base 12 has a drinking well 17' formed therein which provides a drinking orifice in the top thereof that protrudes from the inside of the base 12. The outer wall of the drinking well 17' has a slot formed between an outer wall 78 and inner wall 80. The base 12 also has an outer wall 82 and a shorter inner wall 84 that forms a slot therebetween. The outer wall 82 is continuous with the outer wall 78 such that a smooth wall is formed around the periphery of the base 12 and drinking well 17'. This forms an even contour on the outer perimeter of the feeder. A watering portion 64' is formed with a base having an outer wall portion 86 forming the interior portion of the drinking well 17' and dimensioned to fit between the slot formed from the walls 78 and 80. The reservoir 66 is bounded by a wall 88 which is dimensioned to fit in the slot formed between the walls 82 and 84 in the base 12. A wall 90, similar to the wall 68 in FIG. 5, protrudes upwards from the base of the watering portion 64' and has an orifice 92 disposed therein, similar to the orifice 72. The upper portion of the wall 90 mates into a slot 94 formed in the base 12 proximate the inner perimeter of the drinking well 17'. The reservoir 66 and the drinking well 17' function similar to that described above with respect to FIG. 5.

By disposing the reservoir 66 in the base 12, the weight of the water provides a low center of gravity for the overall feeder 10. Since the hopper 20 must always be above the agitation chamber 32 and the agitation chamber above the feeding bowl 16, the center of gravity tends to become high for the feeder. By disposing the bulk of the water directly underneath the feeder, the center of gravity is significantly lowered. This is accomplished without requiring the use of a weighted base which would add significantly to the cost of the feeder. In addition, the water is coaxial with the central axis of the feeder such that the weight of the food is directly over the axial center of the water. This prevents an off center weight distribution about the central axis and further enhances the stability of the overall device.

In summary, there has been provided a combined feeder and water attachment which places the water in the base of the feeder directly beneath the food supply. To allow the pet access to the water, a drinking well is disposed adjacent the water reservoir protruding outward from the base of the feeder and dimensioned such that it is equal to or slightly larger than the maximum size that the pet requires for drinking. This is usually slightly larger than the size of the pet's tongue. The communication between the reservoir and the drinking well is a small orifice in the bottom of the separation therebetween. This allows a gravity feed system wherein the level within the drinking well is equal to the level within the reservoir. By providing a small surface area of water relative to the reservoir surface area, evaporation is reduced, large temperature variations in the reservoir water are reduced and soiling of the reservoir supply is also reduced.

Although the preferred embodiment has been described in detail, it should be understood that various changes, substitutions and alterations can be made therein without departing from the spirit and scope of the invention as defined by the appended claims.

What is claimed is:

1. An apparatus for providing both feed and water to a pet for extended periods of time, comprising:
   a hopper for containing material to be fed to the pet;
   an agitation chamber disposed beneath said hopper for receiving feeding material therefrom;
   a feeding bowl disposed external to said agitation chamber;
   means for agitating the feeding material in said agitation chamber and dispensing it outward into said bowl;
   a reservoir disposed beneath said agitation chamber for holding a volume of water having a predetermined height, said reservoir in communication with the surrounding environment such that the pressure above the water contained in said reservoir is equal to the surrounding environment; and
   access means to said reservoir for providing a limited amount of water in said reservoir to the pet for drinking, the surface area of the accessible water limited to the maximum necessary for the pet to drink, the depth of the water in said access means equal to the depth of the water in said reservoir;
   said reservoir and access means having a center of gravity disposed on the central access of said hopper and said agitation chamber such that toppling is prevented, the weight of the water in said reservoir providing a stable base.

2. An apparatus for providing water to a pet for extended periods of time, comprising:
   a reservoir for holding a volume of water and having a predetermined height, said reservoir in communication with the surrounding environment such that the pressure above the water contained in said reservoir is equal to the surrounding environment;
   drinking well means for providing a limited amount of water in said reservoir to the pet for drinking, the surface area of the accessible water limited to the maximum necessary for the pet to drink, the depth of the water in said drinking well means equal to the depth of the water in said reservoir;
   means for preventing soiling of the water in said reservoir as a result of soiling in the water in said drinking well means;
   a feeding apparatus disposed on top of said reservoir and a feeding bowl disposed adjacent said reservoir and said drinking well means, said feeding apparatus comprising;
   a hopper for containing material to be fed to the pet;
   an agitation chamber disposed beneath said hopper for receiving feeding material therefrom, said hopper disposed a predetermined height above said reservoir and attached thereto; and
   means for agitating the feeding material in said agitation chamber and dispensing it outward into said bowl; and
   the water in said reservoir providing a low center of gravity to the combination of said reservoir and said eating apparatus.

3. The apparatus of claim 2 and further comprising means for insulating said reservoir.

4. The apparatus of claim 2 and further comprising the means for heating said reservoir to prevent freezing of the water therein under extremely low temperatures.

5. The apparatus of claim 2 wherein said drinking well means comprises a drinking well disposed adjacent said reservoir, said drinking well having a height equal to that of said reservoir and open at the top thereof, said open top dimensioned to be slightly wider than the tongue of the average sized pet, the bottom of said drinking well means in communication with the bottom of said reservoir.

6. The apparatus of claim 5 wherein said means for preventing soiling comprises a separating wall between said reservoir and said drinking well and having an orifice disposed in the bottom thereof, said orifice allowing the flow of water to be directed outward from said reservoir at the bottom thereof to the bottom of said drinking well to create a positive flow from said reservoir to said drinking well to prevent flow from said drinking well to said reservoir to prevent passage of soiled water thereto.

7. The apparatus of claim 6 wherein said orifice is rectangular shaped.

* * * * *